United States Patent [19]
Royce et al.

[11] Patent Number: 5,748,884
[45] Date of Patent: May 5, 1998

[54] AUTONOTIFICATION SYSTEM FOR NOTIFYING RECIPIENTS OF DETECTED EVENTS IN A NETWORK ENVIRONMENT

[75] Inventors: Kevin M. Royce; Stanley D. Berry, both of Colorado Springs; Brian W. Erdmann, Monument; Jeffrey P. Scheetz, Colorado Springs; John D. Cole, Colorado Springs; Hayes J. Landry, Jr., Colorado Springs, all of Colo.

[73] Assignee: MCI Corporation, Washington, D.C.

[21] Appl. No.: 663,401

[22] Filed: Jun. 13, 1996

[51] Int. Cl.$^6$ .................................................. G06F 11/00
[52] U.S. Cl. ............................................................ 395/185.1
[58] Field of Search .......................... 395/185.01, 185.1, 395/182.02, 182.13, 182.16, 733, 740, 741, 200.11, 184.01, 182.22, 200.44, 591

[56] References Cited

U.S. PATENT DOCUMENTS

| | | | |
|---|---|---|---|
| 4,955,070 | 9/1990 | Welsh et al. | 455/2 |
| 4,996,703 | 2/1991 | Gray | 379/40 |
| 5,036,852 | 8/1991 | Leishman | 128/630 |
| 5,065,140 | 11/1991 | Neuburger | 340/634 |
| 5,117,352 | 5/1992 | Falek | 395/182.02 |
| 5,291,492 | 3/1994 | Andrews et al. | 370/110.1 |
| 5,374,951 | 12/1994 | Welsh | 348/4 |
| 5,381,470 | 1/1995 | Cambray et al. | 379/216 |
| 5,414,494 | 5/1995 | Aikens et al. | 355/202 |
| 5,416,725 | 5/1995 | Pacheco et al. | 364/514 |
| 5,423,000 | 6/1995 | Kimura et al. | 395/200 |
| 5,499,196 | 3/1996 | Pacjeco | 364/552 |
| 5,559,611 | 9/1996 | Bloomfield et al. | 358/407 |
| 5,566,337 | 10/1996 | Szymanski et al. | 395/733 |

*Primary Examiner*—Robert W. Begusoliel, Jr.
*Assistant Examiner*—Joseph E. Palys

[57] ABSTRACT

An autonotification system that automatically performs predetermined notification procedures based on specific messages detected from programs called traps. The present invention detects triggering events, such as job failures, abnormal ends (ABENDs), erroneous output, return codes, and successful completions. When a triggering event is detected, the system will reference data that specifies the notification service to perform. Such notification services may include the issuance of numeric pages, alpha-numeric pages, electronic mail, Problem Management Records (PMRs), and voice mail messages. The notification procedures include confirmations of receipt of notifications. The notification procedures also include automatic escalations, based on such confirmations, to notify additional personnel (default recipients) when no response or a negative response is received from the prior recipient of the notification.

37 Claims, 7 Drawing Sheets

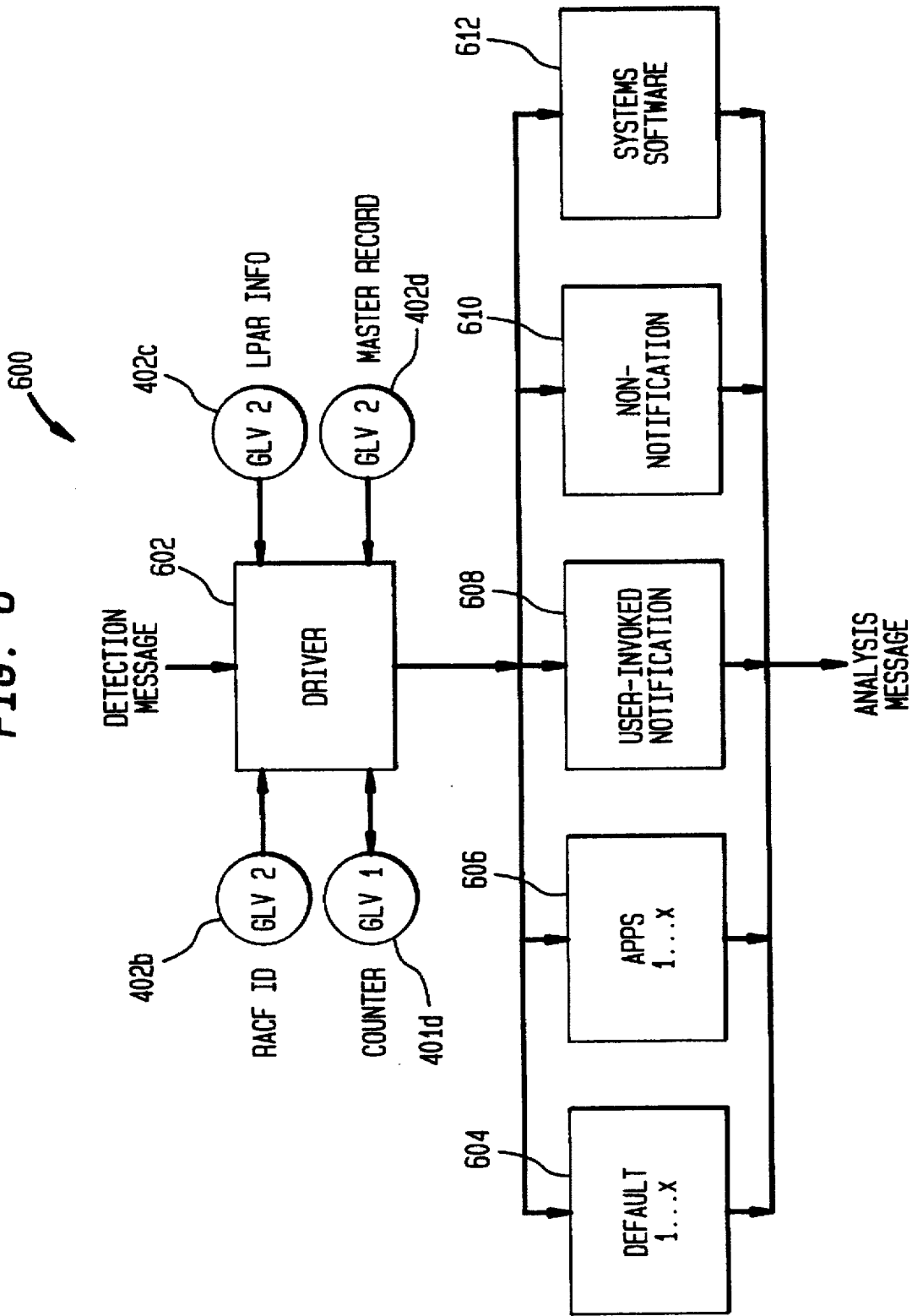

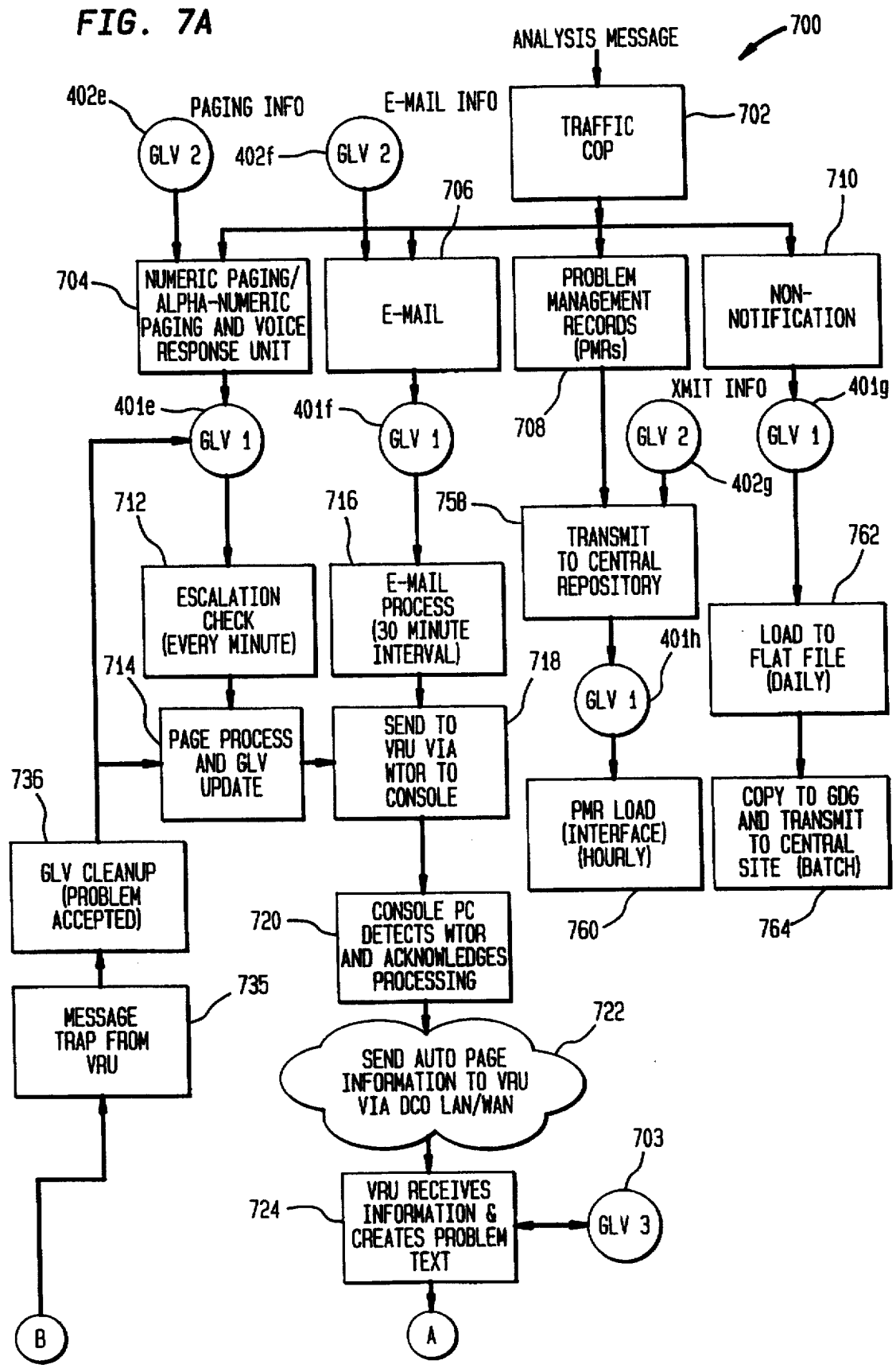

AUTONOTIFICATION SYSTEM FOR NOTIFYING RECIPIENTS OF DETECTED EVENTS IN A NETWORK ENVIRONMENT

BACKGROUND OF THE INVENTION

1. Field of the Invention

The present invention relates generally to the field of network communications, and more particularly, to a system and method for automatically performing pre-determined notification procedures that include escalations as well as confirmations.

2. Related Art

Business enterprises that utilize mainframe computers for data processing have a critical need to monitor executable programs to ensure successful completion of the programs. These programs may be batch jobs or executable commands. Many of these programs, such as production jobs, perform crucial business functions. If such programs should fail, it is critical that support personnel be quickly notified so they can fix the problem and make any necessary adjustments in the execution of other programs. It may also be necessary to notify personnel of events other than job failures and Abnormal Ends (ABENDs), such as if a job outputs erroneous data or simply completes successfully.

When a program executes, the computer's operating system will provide various messages indicating the status of the program's execution. For example, when a job ABENDs, the operating system will produce a message indicating such. These messages are displayed on an operator console. A display monitor may be connected to the operator console for viewing the operating system messages. Enterprises commonly employ personnel in a capacity known as Production Control to monitor these messages and perform actions on certain events. These actions usually involve restarting jobs. However, many actions required on a job that has failed must be performed by personnel other than Production Control. Thus, quick notification of these personnel is necessary.

Commonly, a program will have associated documentation specifying who should be notified and how. Such notification may be via pager, electronic mail, phone mail, or issuance of a Problem Management Record (PMR). The documentation may also include a set of escalation procedures specifying additional personnel (default recipients) and means of notification in case the primary contact person is unavailable. For example, if a certain job ABENDs, Group 1 personnel would be the first to be notified. If Group 1 personnel are unavailable, then Group 2 personnel should be notified.

Documentation on notification procedures, while useful, requires manual intervention and effort. It can be very time-consuming for Production Control to reference job documentation, determine who should be notified next, and perform that notification. While some systems exist for automatically issuing a page or e-mail notification of job failures, they do not perform automatic escalation procedures and confirmation of receipt of notifications.

SUMMARY OF THE INVENTION

The present invention is directed towards a notification system within a communication network environment that automatically performs pre-determined notification procedures based on specific messages detected from an operating system. Such notification procedures include both escalations and confirmations.

The present invention, referred to as Autonotification or the Autonotification System, detects certain triggering events, such as job failures, ABENDs, erroneous output, return codes, and successful completions. When such an event is detected, the System references data that specifies notification procedures, and then performs customized decision-support processes to determine specific actions to execute. Such actions include the issuance of numeric pages, alpha-numeric pages, electronic mail (e-mail), Problem Management Records (PMRs), and voice mail messages.

The System performs these actions according to pre-determined escalation procedures. For example, upon detecting a job ABEND, the System may issue a page to Group 1. If after 5 minutes Group 1 does not respond, the System will issue a page to Group 2. The System may also issue an e-mail to Group 1, Group 2, or a third group. The System may automatically submit a PMR.

The System also has the capability of receiving confirmations of receipt of notifications, and performing actions of escalation based on such confirmations. A conventional Voice Response Unit (VRU) is used to record each notification that is issued and register the recipient's confirmation. If a confirmation is not received, escalation is automatically performed.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 6 is a flow diagram illustrating the analysis process of the present invention; and FIGS. 7a and 7b are flow diagrams illustrating the autonotification process of the present invention.

DETAILED DESCRIPTION OF THE INVENTION

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

Figure 1:
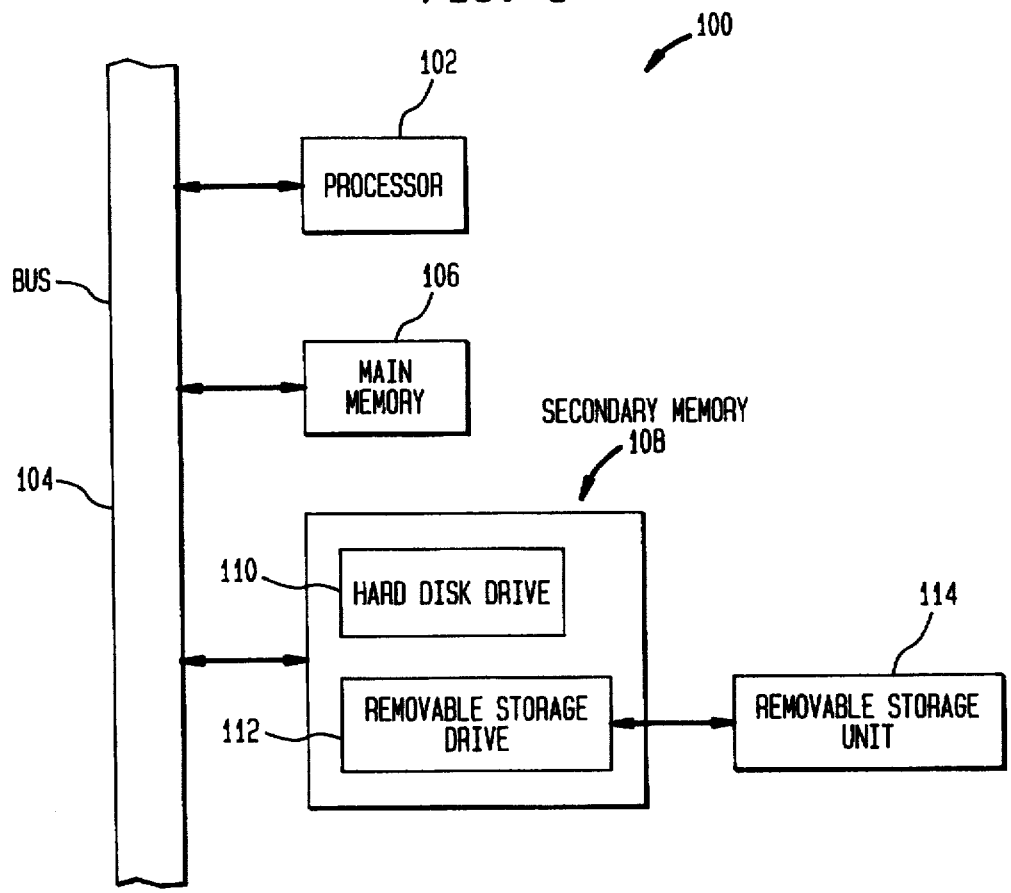
FIG. 1 illustrates an exemplary computer system in which the present invention may be embodied.

In one embodiment, the invention is directed to a computer system operating as discussed herein. An exemplary computer system 100 is shown in FIG. 1. The computer system 100 includes one or more processors, such as processor 102. The processor 102 is connected to a communication bus 104.

The computer system 100 also includes a main memory 106, preferably random access memory (RAM), and a secondary memory 108. The secondary memory 108 includes, for example, a hard disk drive 110 and/or a removable storage drive 112, representing a floppy disk drive, a magnetic tape drive, a compact disk drive, etc. The removable storage drive 112 reads from and/or writes to a removable storage unit 114 in a well known manner.

Removable storage unit 114, also called a program storage device or a computer program product, represents a floppy disk, magnetic tape, compact disk, etc. The removable storage unit 114 includes a computer usable storage medium having stored therein computer software and/or data.

Computer programs (also called computer control logic) are stored in main memory and/or the secondary memory 108. Such computer programs, when executed, enable the computer system 100 to perform the features of the present invention as discussed herein. In particular, the computer programs, when executed, enable the processor 102 to perform the features of the present invention. Accordingly, such computer programs represent controllers of the computer system 100.

In another embodiment, the invention is directed to a computer program product comprising a computer readable medium having control logic (computer software) stored therein. The control logic, when executed by the processor 102, causes the processor 102 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art.

The present invention provides automatic notification to designated personnel for computer jobs that are executed on mainframe computers. Notification can be in the form of a numeric page, an alphanumeric page, an electronic mail (e-mail) message, a problem management record (PMR), and/or a voice mail message. The present invention, through the detection of certain triggering events, references specific notification procedures, including instructions on which recipient to notify, and performs customized decision-support processes to determine specific actions to execute. These customized decision-support processes include predetermined escalation procedures. The system is also capable of receiving confirmations of receipt of notification, and performing escalation procedures based on confirmation responses.

Figure 2:
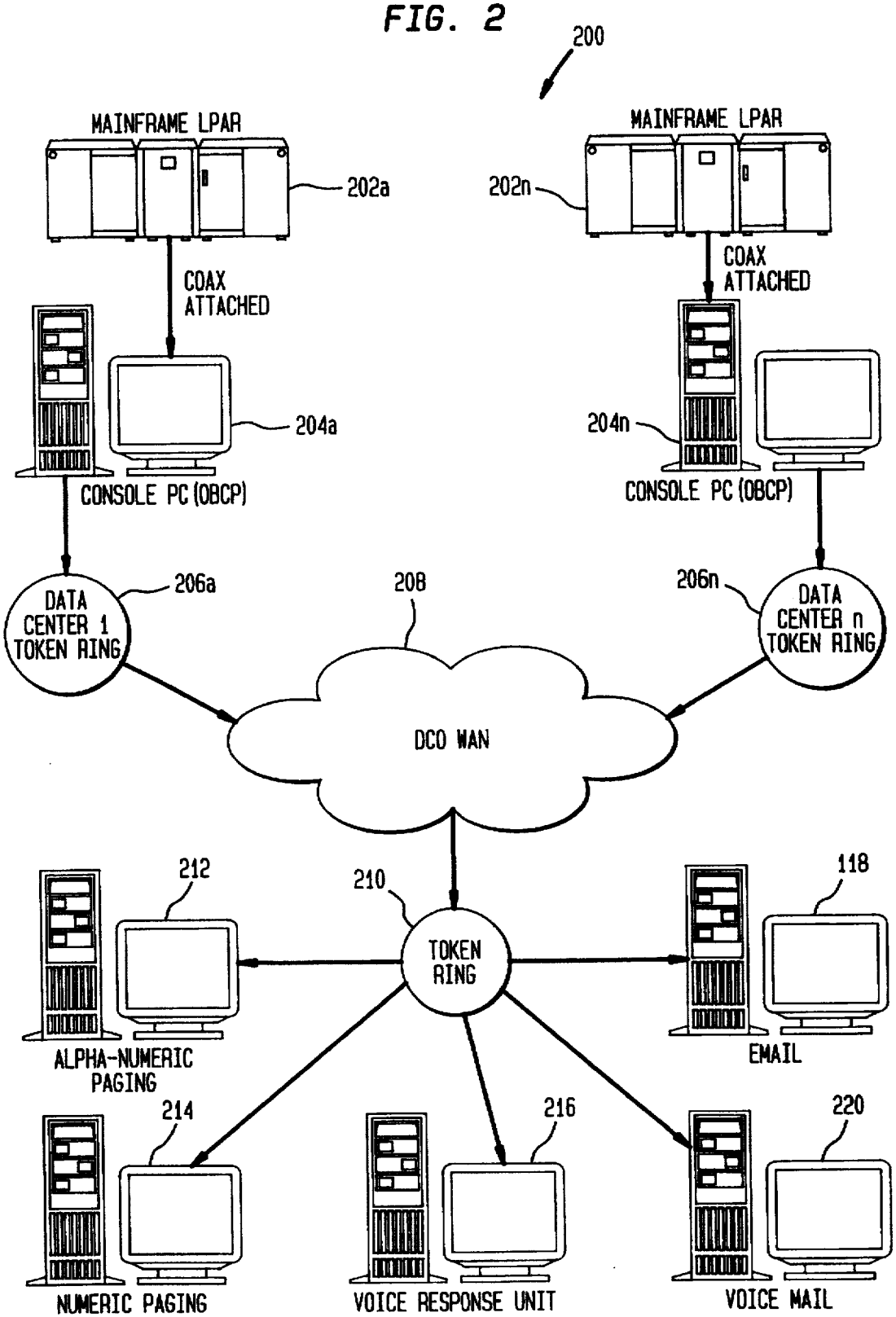
FIG. 2 illustrates an exemplary physical network architecture in which the present invention may be embodied.

Prior to describing the invention in detail, an exemplary network architecture 200 in which an embodiment of the present invention may be found is shown in FIG. 2. The present invention is described in terms of the exemplary network architecture 200. Description in these terms is provided for convenience only. It is not intended that the present invention be limited to application in this exemplary network architecture 200. In fact, after reading the following description, it will be apparent to a person skilled in the relevant art how to implement the invention with other network architectures.

The exemplary computer system 100 is represented in exemplary network architecture 200 as a mainframe computer 202, such as an IBM 3090 processor. Each physical mainframe unit may be partitioned into logical partition s (LPAR). Partitioning the mainframe into logical units is well known to one skilled in the relevant art. Each mainframe LPAR 202a ... 202n is treated as a n individual computer, with a number of jobs being processed (executing) on each one. Each site that houses a mainframe 202a ... 202n is referred to as a Data Center in a typical enterprise. Each mainframe LPAR 202a ... 202n is connected via coaxial cable to an Outboard Console PC (OBCP) 204a ... 204n. The OBCP 204a ... 204n serves as an operator console that captures the operating system image, which is used to monitor an operating system. In a preferred embodiment of the present invention, the OBCP 204a ... 204n is a standard PC operating with OS/2 and Computer Associates' Outboard Control Facility (OCF) software.

Each OBCP 204a ... 204n is connected to a Data Center token ring local area network (LAN) 206a ... 206n. The Data Center token ring LANs 206a ... 206n are connected to each other via a Data Center Operations wide area network (WAN) 208.

The Data Center Operations WAN 208 is also connected to another token ring LAN 210. Token ring LAN 210 supports a number of PCS 212–220 operating with specialized software.

The present invention provides autonotification for jobs that are executed on a plurality of mainframe LPARs 202a ... 202n. Events that trigger the autonotification system may include job failures, ABENDs, normal completion of a job, completion of a job with erroneous data, completion of a job with error return codes, delaying of a job, cancellation of a job, and numerous other types. The invention detects a triggering event that occurs during the execution of programs on the mainframe LPAR 202a ... 202n and determines the appropriate actions to take. This is accomplished with software executing on the mainframe LPAR 202a ... 202n. This software is stored on the mainframe LPAR's 202a ... 202n main memory 106 and/or secondary memory 108. A message specifying such actions is then written to the corresponding OBCP 204a ... 204n. The OBCP 204a ... 204n captures the message from the mainframe LPAR 202a ... 202n and transmits it over the corresponding Data Center token ring LAN 206a ... 206n to which it is connected.

The message is then transmitted through the Data Center Operations WAN 208 to token ring LAN 210. Token ring LAN 210 can be located at the same site as the mainframe LPARs 202a ... 202n or at a specially designated site. Token ring LAN 210 supports a number of PCS 212–220 operating with specialized software. In the preferred embodiment, this software is Computer Associates' OCF. Each PC 212–220 connected to token ring LAN 210 supports a specific notification service. In one embodiment, different notification services may be executed on common PCS.

In a preferred embodiment, each notification service is executed on a separate PC. One PC 212 executes an Alpha-Numeric Paging notification service and another PC 214 executes a Numeric Paging notification service. These PCS 212 and 214 are connected to a conventional paging network. Another PC 218 executes an E-mail notification service and is connected to a conventional E-mail system, such as MCI Mail, via standard phone lines and a modem. Another PC 220 executes a Voice Mail notification service and is connected to a conventional voice mail system.

There is also a PC 216 configured to operate as a Voice Response Unit (VRU). PC 216 is connected to a telephone line that accesses the Public Switched Telephone Network (PSTN). The VRU records all messages sent from the OBCP 204a ... 204n and is used to confirm a response to autonotification messages sent out. For example, if a paging notice is sent from the Numeric Paging PC 214 to an individual, that individual will call the VRU over the PSTN, navigate a voice response menu to access the particular message that corresponds to the paging notice, and confirm that the paging notice was received. The individual may also acknowledge responsibility for the notice or escalate responsibility for the notice to another individual.

Figure 3:
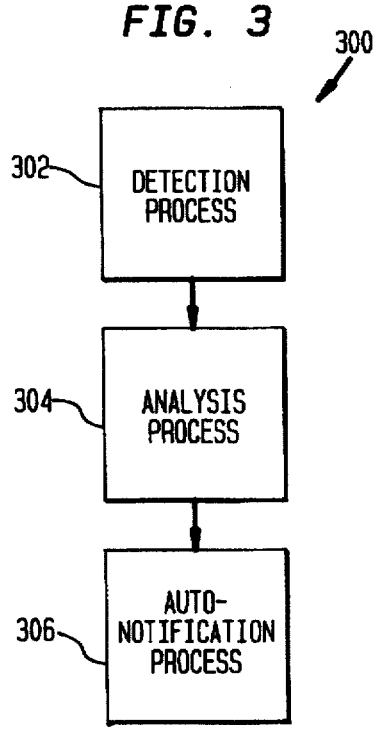
FIG. 3 is a high level flow diagram illustrating the operation of the present invention.

A system flow diagram 300 illustrating the operation of the present invention is shown in FIG. 3. The present invention performs three high-level processes. The first high level process is the detection of a triggering event 302. The second high level process 304 is the analysis of the detected triggering event. The analysis of the detected triggering event 304 includes the determination of which notification service to perform. The last high-level process 306 is the actual autonotification process. Each of these processes 302–306 is described below in reference to FIGS. 5–7, respectively.

Throughout the application reference is made to the use of global variables. The present invention uses two types of global variables. The first type of global variable is created internally to the system. The second type of global variable is created external to the system.

Each of the high-level processes 302–306 creates internal data for temporary use. The internal data is stored in global variables GLV1. GLV1 global variables are dynamic, as they are created when they are needed by the high-level processes 302–306 and are deleted when they are no longer needed by the high-level processes 302–306. These global variables are identified throughout FIGS. 4–7 as GVL1 401a . . . 401h.

The present invention uses Data Control Tables to enter data into the system. The Data Control Tables are created external to the high-level processes 302–306 described above. The Data Control Tables are transmitted to each LPAR 202a . . . 202n site from the central data center on a daily basis and then subsequently loaded into global variables used throughout the system. These global variables are identified throughout FIGS. 4–7 as GLV2 402a . . . 402g. Data can be added, deleted, or modified within the Data Control Tables. Thus, the need to reprogram the source code to add, delete, or modify the data is eliminated. This provides a high level of configurability and portability. The implementation of new applications for the invention, as well as the tailorability of the invention to the needs of various companies in various industries, is accomplished by simply updating the Data Control Tables.

Figure 4:
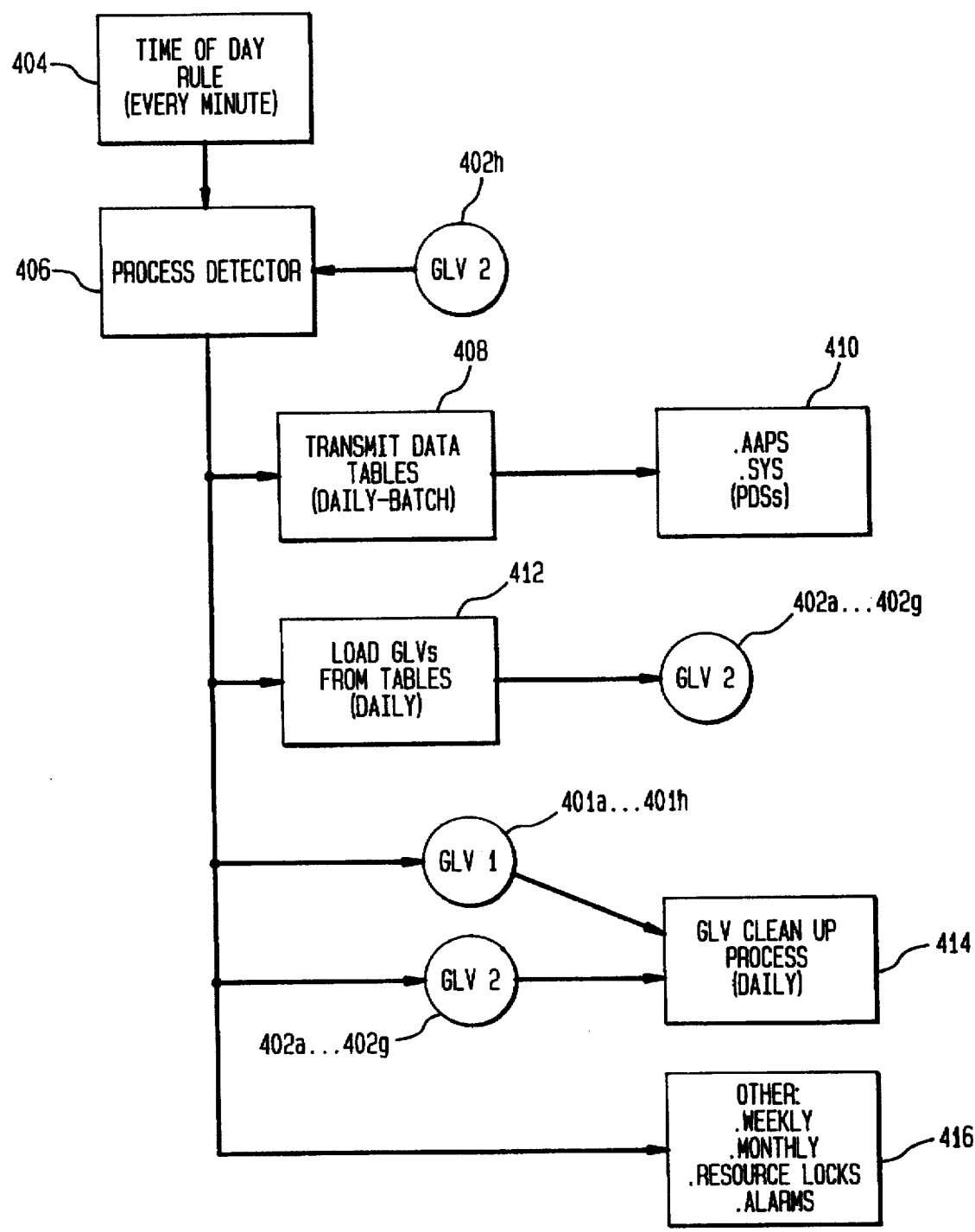
FIG. 4 is a flow diagram illustrating an auxiliary data entry process of the present invention.

The present invention also contains processes that utilize time sensitive rules. An auxiliary process is used to trigger a single time-of-day rule to invoke other processes that run at other specified times and to load the data from the Data Control Tables into global variables GLV2 that are used throughout the high level processes 302–306. This auxiliary process is illustrated in FIG. 4. The global variables entered from the Data Control Tables are identified as GLV2, 402a . . . 402g in FIG. 4.

Step 404 is a single time-of-day rule that invokes other time sensitive processes in the system. It is executed every minute to obtain the maximum granularity needed to capture all other time sensitive rules. Simply executing step 404 triggers step 406.

Step 406 is a process detector that reads in GLV2 402h. GLV2 402h contains a program control table that specifies the timing of each time sensitive process in the system. An example of the program control table in one embodiment, along with a single entry, is as follows:

| Jobname or Exec | Y/N | B/E | Cycle | Freq | System |
|---|---|---|---|---|---|
| LGLVLATE | Y | B | HOURLY | 8 | ALL | in which the fields are defined as follows:

| | |
|---|---|
| Jobname or Exec | name of batch job or executable command that contains the time-of-day rule |
| Y/N | yes/no switch for processing of the job or executable |
| B/E | type of code - (B)atch or (E)xecutable |
| Cycle | cycle of execution - minute, hourly, daily, weekly, monthly |
| Freq | frequency of execution (how often the cycle occurs) |
| System | particular LPAR, site of co-located LPARs, or all LPARs |

Thus, in this example, the job LGLVLATE is a batchjob that is set to run once every 8 hours on all LPARs.

Step 406 reads in this table from GLV2 402h and triggers the execution of each program listed, per the table's instructions. Step 406 also triggers the loading of global variables from the Data Control Tables. Again, Data Control Tables are what users of the invention use to enter the various data that are identified in FIGS. 4–7 as GLV2 402a . . . 402g. This minimizes the maintenance and configuration efforts required by the system for establishing one source of configuration data.

In step 408, the Data Control Tables are transmitted to each LPAR site via daily batch transmission. The tables are then loaded into two partitioned datasets (PDSs) 410. One PDS (.APPS) contains application-related data, such as a Late Jobs Table 402a (FIG. 5), a Paging Information Table 402e (FIG. 7a), an E-mail Information Table 402f (FIG. 7a), and a Master Record Table 402d (FIG. 6). The other PDS (.SYS) contains systems-related data, such as a Program Control Information Table 402b (FIG. 6), an LPAR Information Table 402c (FIG. 6), and a Transmission Control Information Table 402g (FIG. 7a).

In step 412, each LPAR at a given site loads the data from the site's PDSs 410 into the appropriate global variables GLV2 402a . . . 402g. This occurs on a daily basis, and is triggered by the Process Detector 406.

In step 414, all global variables 401a . . . 401h/402a . . . 402g, both internal and external, that are more than X days old are cleared. In the preferred embodiment, since all global variables are loaded each day, any global variable that has not been updated in more than 10 days is cleared.

Step 416 is a process that performs any miscellaneous updates, as requested by the users. Step 416 is also triggered by the Process Detector 406. Such updates may include the reset of counters (such as GLVI 401d) or the reset of resource locks for data access control.

The storing of both internal and external data in global variables eliminates the intensive input/output processing required to extract data from Direct Access Storage Devices (DASD), tape drives, and other data storage devices. GLV1 401a . . . 401h and GLV2 402a–402g global variables exist in the memory of the mainframe LPAR 202a . . . 202n, and can be passed from program to program within the LPAR. There is also an additional global variable that is used by the VRU 216. This global variable is identified in FIG. 7 as GLV3 703.

Detection

The detection process 302 of the present invention uses programs known as traps to identify and detect autonotification triggering events. These programs 'trap' messages from the operating system that indicate triggering event occurrences. These programs, in turn, generate detection messages indicating such events and send these messages to the analysis process 304.

Figure 5:
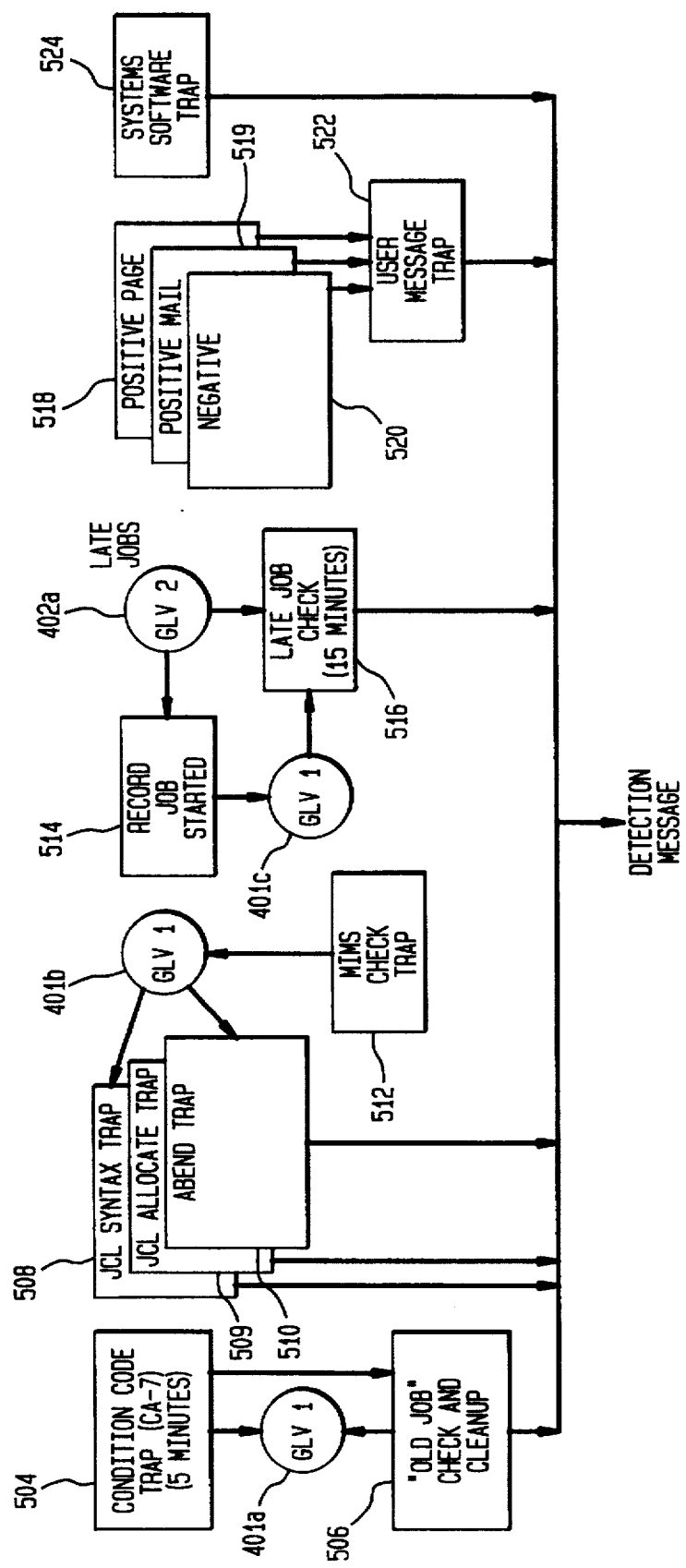
FIG. 5 is a flow diagram illustrating the detection process of the present invention.

There are three types of traps. The first type of trap uses time sensitive processes and are executed according to a pre-defined schedule. The second type of trap uses message rules and are executed when a triggering event message is created. The third type of trap uses user-invoked rules and are executed according to instructions from a user. Several examples of traps 500 are shown in FIG. 5. In alternative embodiments, more traps may be added.

A Condition Code Trap, shown as step 504, executes as a time sensitive process. The execution of a Condition Code Trap is triggered by step 406 according to the program control table. In this example the Condition Code Trap 504 executes every 5 minutes. In trap 504, condition codes from a job exception monitoring and reporting system, such as CA-7 (Computer Associates product 7) are detected by screen-scraping a CA-7 console. These condition codes may indicate a triggering event. When a triggering event is detected, the condition code and jobname are recorded to GLV1 401a.

Since step 504 is executed every 5 minutes, the same triggering event for a particular job may be detected several times before it is fixed. Therefore, a check is made in step 506 for old jobs previously detected. Jobnames detected from the previous execution of step 504 are compared with jobnames detected from the current execution of step 504. If a jobname detected in the current execution of step 504 was also detected in the previous execution of step 504, it is assumed that the job has been reported to the analysis process 304. If a jobname is detected in the current execution of step 504, but was not detected in the previous execution of step 504, it is assumed that the detection is new, and the job is reported to the analysis process 304. If a jobname is not detected in the current execution of step 504, but was detected in the previous execution of step 504, it is assumed the problem has been fixed, and the jobname is cleared.

Steps 508–510 are examples of traps that execute as message rules. These traps 508–510 are shown as job control language (JCL) and ABEND traps that detect messages from an operating system. Each message has a code number identifying its type (JCL syntax error 508, JCL allocation error 509, and ABENDs 510). The invention invokes a message rule based on this code number. The rule determines if a detection message should be created and processed.

Some enterprises make use of a job re-queuing system. Job re-queuing systems cancel and re-queue jobs for many reasons. For example, if Job A requires exclusive use of a dataset, but that particular dataset is presently in use by Job B, the job re-queuing system will cancel and re-queue Job A. The job re-queuing system will continue to do this until Job A can acquire exclusive use of the dataset. The present invention's implementation of the job re-queuing system is shown as the Multi-Image Manager (MIM) in step 512. Each cancellation of Job A will create an ABEND message that creates a trap in step 510. To prevent redundant ABEND message s from being detected, a MIM check is run in step 512 to identify each job that is re-queued by MIM. The re-queued jobs are recorded in GLV1 401b. Prior to creating a detection message, steps 508, 509, and 510 will first check GLV1 401b to see if the job was re-queued by MIM. If so, a detection message will not be created.

In step 516, a trap for late jobs is executed as a time-of-day rule. This is shown in FIG. 5, for example purposes only, to be every 15 minutes. GLV2 402a contains a dataset, loaded from the Data Control Tables, that identifies each batch job considered time critical, earliest job start times, latest job start times, days of execution, and similar information. In step 514, the actual start time for each job listed in GLV2 202a is tracked, and the jobname and start time is recorded in dynamic global variable GLV1 401c. The Late Job Check in step 516 then compares the actual start time in GLV1 401c with the scheduled start time in GLV2 402a. If a late start time is detected, step 516 will send a detection message to the analysis process 304. Since the Late Job Check 516 is set to execute every N minutes (15 minutes), a start time must be late by increments of N minutes (15 minutes) to be detected.

Examples of user-invoked rules that trigger the autonotification process are shown in steps 518,519, and 520. As the name suggests, user-invoked rules are based on user input.

Such input may be inserted by a user into a job's program or JCL as a request to be notified if some event occurs. Such an event may be positive, such as the successful completion of a job, or negative, such as a job failure or a job's generation of an error return code or output of erroneous data. If such an event occurs, then a message is created in the appropriate step (518, 519, and 520). This message is trapped in the User Message Trap shown in step 522.

In step 518, the user requests that a page be issued at the occurrence of the positive event defined by the user-invoked rule, such as the completion of a job. In step 519, the user requests that an electronic mail (e-mail) be issued as a result of a positive event defined by the user-invoked rule. In step 520, a user requests a notification as a result of a negative event, such as the ABEND of a job. Steps 518–520 are some examples of user-invoked rules to trigger an autonotification, and should not limit the scope of inclusions of such rules in any embodiment.

Several other types of traps may be implemented. For example, in step 524, a message may be trapped to indicate a hardware failure or a specific systems failure created in an external program.

To report a triggering event to the autonotification process 306, a detection message indicating the specific triggering event is sent to the analysis process 304.

Analysis

The analysis process 304 performs the tasks of identifying which jobs are eligible for notification services, ascertaining which type of notification services are to be requested, and adding additional information to the detection message to form an analysis message to be sent to the autonotification process 306. A detailed flow diagram 600 of the analysis process 304 is shown in FIG. 6.

The analysis process 304 begins with the receipt of the detection message, sent from one of the previously described traps, by a Driver process in step 602. This detection message, which may be embodied in various formats, contains the following data:

Jobname (which includes a High Level Qualifier (HLQ))
Job number
Resource Access Control Facility (RACF) ID of the job user
LPAR on which the job executed
Job code that identifies the triggering event -continued

```
Job triggering event date/time/step
Trap ID
```

The Driver 602 uses several global variables to first determine if the job is one that should be tracked, and then to enhance the detection message with additional information. The Driver 602 will match the RACF ID of the job to a list of those contained in GLV2 402b. GLV2 402b lists those RACF IDs that are to be tracked by the invention. In one embodiment, only production jobs are served by the autonotification process; production jobs will have specific RACF IDs assigned. If the job's RACF ID matches one listed in GLV2 402b, then the Driver 602 will continue processing it. If not, the Driver 602 will discard it.

Information about the mainframe LPAR 102a ... 102n on which the job executed is obtained from GLV2 402c. This information includes the local time zone of the LPAR, an on/off processing switch for each LPAR, and a 2-digit code for each LPAR. The on/off processing switch determines if the autonotification process should be conducted for any jobs running on that LPAR, and provides an easily accessible level of control over the autonotification process for each LPAR. If the on/off processing switch is set to "off", detection messages for any jobs executing on that LPAR that are received by the Driver 602 will be terminated. Otherwise, processing continues.

The 2-digit LPAR code is used in conjunction with a 3-digit number that is generated by GLV1 401d. GLV 401d operates as a counter to assign a Problem ID to each detection message. The assignment of an LPAR code to a sequentially-generated number provides a unique Problem ID assignment, which is used for the purpose of tracking each problem.

The Driver 602 will then match the High Level Qualifier (HLQ) of the jobname to a Master Record maintained in GLV2 402d. The Master Record, which is added to the detection message to form the analysis message, contains the following data:

```
Group ID
on/off processing switch
autonotification switches
```

The Group ID is a four-character code that identifies the group or organization responsible for execution of jobs with certain HLQs. This group will generally be the receiver of the autonotifications. While each HLQ belongs to a specific group, a group may have several HLQs assigned to it.

The on/off processing switch is used to determine if the analysis process should proceed for the corresponding HLQ. If the on/off processing switch is set to on, processing continues. If the on/off processing switch is set to off, processing terminates.

Autonotification switches are two-valued switches that are set to "Yes" or "No", and correspond to each notification service. They determine which notification services are to be performed.

An example of a Master Record is:

```
FO_NOPS_ON_Y_N_Y_Y
in which:
```

-continued

```
FO       is the High Level Qualifier (HLQ)
NOPS     is the Group I.D. (corresponds to a specific organization)
ON       is the on position for the on/off processing switch
Y_N_Y_Y  are the switch positions for each notification service
         (Alpha-numeric page, Numeric page, electronic mail,
         and Problem Management Report (PMR))
```

In this example, all jobs with an HLQ of "FO" belong to an application that has a Group I.D. of "NOPS". When a detection message for a job with a HLQ of "FO" is received by the Driver 602, it is assigned this Master Record, with corresponding switches.

The data from the Master Record is added to the data sent from the traps (the detection message). The resulting record is then passed on to the next level of processes.

The next level of processes, 604–612, are decision-support processes which provide further analysis on determining which notification service should be performed. In these processes 604–612, the switches added by the Master Record may be changed according to certain analysis procedures.

Messages trapped by user-invoked rules 518/519/520 are sent to a User-Invoked Notification process 608 based on the Trap ID. Messages trapped by systems software trap 524 are sent to a Systems Software process 612 based on the Trap ID. Other messages are sent to other processes (steps 604/606) based on the Group ID from the Master Record.

The Group ID of the Master Record is used to determine which process (604/606) the Driver 602 will send the analysis message to next. Within GLV2 402d, HLQs which do not require customized processing, are assigned a Group ID of "DFLT", for default. Records assigned a group ID of default use standard predefined autonotification processes.

The default cases are sent to a Default process 604. The "1 . . . x" designates that several different programs may be included here, one for each type of default case. The Default process 604 will determine the appropriate action to take, based on company policy. For example, a certain HLQ may be assigned a Group ID of "DFLT" to ensure that jobs with this HLQ are sent to a pre-defined autonotification process.

Master Records with a Group ID that corresponds to a specific organization (i.e., NOPS) are sent to an APPS process 606. The "1 . . . x" designates that several different programs are included here, one for each organization or Group ID. Each organization may have a specific set of analysis procedures to perform, although, one APPS program may be used for multiple organizations if their procedures are identical.

The analysis procedures performed by the APPS process 606 determine the notification services that are to be performed for multiple groups, and are realized by customized code. An organization may have multiple sets of pagers or e-mail addresses that are to be notified in an escalating manner. Therefore, a Subgroup ID is assigned to the Master Record. Each subgroup is defined by a specific e-mail address or set of pagers. The assignment of multiple Subgroup IDs to a Group ID, as well as the specific analysis procedures that act on each Subgroup ID, may be triggered by any data that exist in the detection message. Most commonly, it is based on the jobname.

The analysis procedures then act on each Subgroup, which may result in a resetting of the switches for the Master Record of each Subgroup ID. The analysis procedures themselves are simply instructions on which notification services to perform on which Subgroup. They are dictated by company policy. For example, switches added by the Master Record may come into the APPS process 606 as:

ON_Y_N_N_N

The APPS process 606 may then assign one of several Subgroup IDs, and reset switches per programmed logic that is dictated by organizational procedures. This results in modified switches, for example:

ON_N_Y_Y_N.

Messages trapped by a user-invoked trap, as in steps 518–520, send the analysis message to a User-Invoked Notification process 608, based on the Trap ID. This User-Invoked Notification process 608 will not generally perform any action on the switches, since they have already been set according to user specifications.

If the HLQ of a job does not match any Master Record in GLV2 402d, or no LPAR was identified in GLV2 402c, then the detection message is sent to a Non-Notification process 610. Although no autonotification is performed on these jobs, a record of these jobs will be kept for reference. All autonotification switches will be set to "No", indicating non-notification.

If the autonotification system was triggered by a systems trap, as in step 524, then the analysis message is sent to a Systems Software process 612, based on the Trap ID. This process performs customized analysis for switch-setting based on user preferences, and is configurable.

Autonotification

Figure 7B:
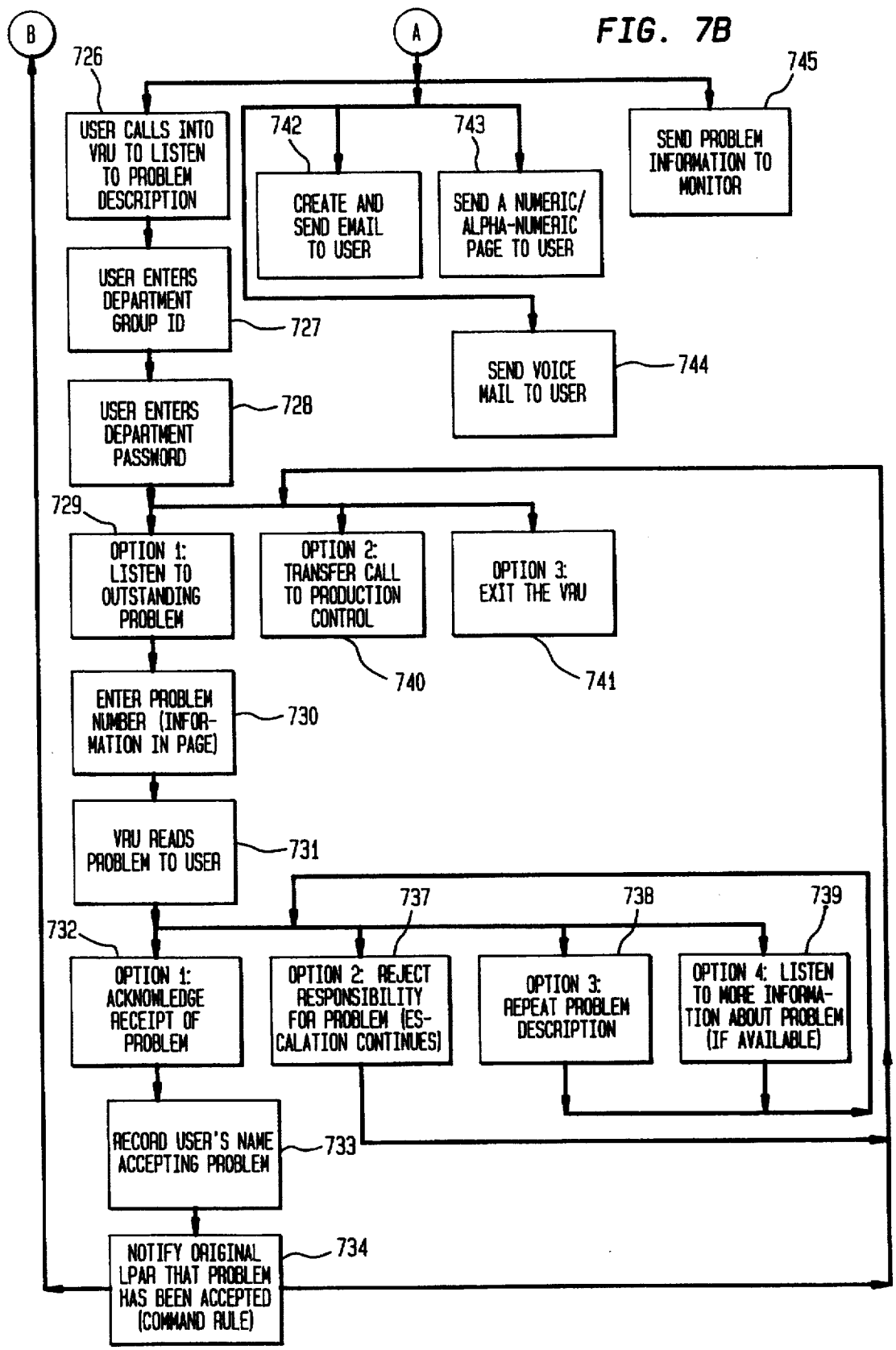

A detailed flow diagram 700 of the autonotification process 306 is shown in FIGS. 7a and 7b. The analysis message, which contains data from the traps and the Master Records, is collected by a Traffic Cop process 702 that determines which notification services should receive the message. This determination is based on the autonotification switches that were added by the Master Record. The Traffic Cop 702 may be permitted to send the analysis message to each notification service for which the switch is set to "Yes".

Analysis messages for which the NPAGE switch or the APAGE switch is set to "Yes" are sent to a Numeric Paging/Alpha-numeric Paging and Voice Response Unit (VRU) process 704. This process will read the Master Record of the message—specifically the Group ID, HLQ, and Subgroup ID—and match that to a record maintained in GLV2 402e. GLV2 402e contains information specifying the paging procedures for each Group/Subgroup. This includes paging numbers, escalation sequence and times, and security codes for accessing the VRU 216.

Step 704 will record the analysis message data, along with data retrieved from GLV2 402e, in dynamic global variable GLV1 401e, forming an autonotification message. Thus, GLV1 401e is an autonotification message comprised of all information relevant to issuing all necessary auto-pages: all data pertaining to the job triggering event, each paging number, sequence and time to issue each page, and VRU security codes. It also contains a counter, referred to as "level", that tracks the number of escalations performed. When first created, level=0. It is also timestamped with the time of the job triggering event.

In step 712, an Escalation Check process executes each minute and checks GLV1 401e to see if the next escalation is due. This is determined from reading the current timestamp, level, and escalation time. If the escalation time vs. current timestamp indicates an escalation time is due, step 712 will trigger the paging process in step 714.

Step 714 initiates the paging process, and then updates GLV1 402e to increase the escalation level count by one and timestamp it with the current time. To initiate the paging process, a Write to Operator Respond (WTOR) message is created in step 718 and written to the OBCP 204a ... 204n. The WTOR message requests a specific page (the next one on the escalation list) and contains all pertinent information needed to send the page, including the page message. The page message briefly describes the problem.

In step 720 the OBCP 204a ... 204n detects the WTOR and sends an acknowledgment back to the main process running on the LPAR 202a ... 202n. Then, in step 722, a page rrequest message is transmitted over the Data Center LAN 206a ... 206n and WAN 208 to the VRU 216.

In step 724, the VRU 216 receives the page request message and creates voice-response problem text that will be played to the paged caller. This text is stored in the VRU's global variable GLV3 703.

The appropriate autonotification actually takes place now. In the current example of a numeric page or an alpha-numeric page, the page request message is transmitted over LAN 210 to the respective PC (212/214) executing the Numeric Paging notification service or the Alpha-numeric Paging notification service. Both paging notification services are connected to conventional paging systems. In step 743, the page is issued.

In step 726 the user receives the page and calls into the VRU 216. In navigating the voice-response menu, the user enters the respective Group ID (step 727), which is translated into telephone numerical keyboard format, and password (step 728).

The user is then allowed three options. The Listen Option (step 729), allows the recipient of the page to listen to the text that was created in step 724 describing the problem. Prior to listening to the text, the recipient of the page must enter the Problem ID that was sent with the page (see step 730). In step 731, the VRU 216 reads the problem description to the recipient of the page. This includes the jobname or job number, along with the triggering event type identified from the code.

From this point, the recipient of the page is allowed four options. The recipient acknowledges receipt of the problem (step 732). This is also known as the Acceptance Option. The recipient acknowledges receipt of the problem by entering the appropriate code. In step 733, the VRU 216 records the user's name for reference. In step 734, the VRU 216 sends a message back to the appropriate LPAR 202a ... 202n acknowledging that the problem has been accepted by someone. In step 735, the acknowledgment message from the VRU 216 is received and trapped by the OBCP 204a ... 204n, which communicate s the message to the LPAR 202a ... 202n. In step 736, GLV1 401e is cleaned up; that is, data for this particular problem is cleared, since a user has acknowledged receipt of the problem. This prevents further escalation and closes the escalation process.

After listening to the problem description in step 271, the recipient may select the Reject Option, step 737. Here, the recipient rejects responsibility for the problem, and the VRU menu takes the user back to steps 729/740/174. If this happens, the Escalation Check in step 712 will determine the next escalation is due, and will trigger another page to initiate in step 714.

After listening to the problem description in step 271, the user may select the Replay Option, step 738, which will simply replay the problem description, or the Additional Information Option, step 739, which allows for additional information to be played, if any additional information is available.

After entering a password in step 728, the recipient may select the Transfer Option, (step 740). Here, the call is transferred to Production Control. The selection of the Exit Option (step 741), allows the user to exit the VRU 216.

Messages for which the E-MAIL switch is set to "Yes" are sent from the Traffic Cop in step 702 to an E-mail process 706. This process will read the Master Record of the message—specifically the Group ID, HLQ, and Subgroup ID—and match that to a record maintained in GLV2 402f. GLV2 402f contains information specifying the e-mail procedures for each Group/Subgroup. This includes e-mail addresses, mailboxes, or distribution lists and escalation sequences and times. In another embodiment, only a single e-mail address is contained in GLV2 402f, of which the end user maintains and controls the distribution list.

In step 706 the analysis message data, along with data retrieved from GLV2 402f, is recorded in dynamic global variable GLV1 401f, forming the autonotification message. Thus, GLV1 401f now contains the autonotification message which has all information relevant to issuing an e-mail. The E-mail process shown in step 716 operates every 30 minutes, reading data from GLV1 401f and sending an e-mail request message for issuance to the defined recipient. This process may operate in the same manner as the numeric/alphanumeric paging process, except there are no escalation or acknowledgement processes. That is, send a message to the VRU 216, create problem text 724, issue e-mail (step 742), receive call from recipient, etc., as defined in steps 718–736. The exceptions would be substituting step 742 for step 743, which requires that an e-mail request message be transmitted over LAN 210 to the PC 218 executing the E-mail notification service to issue the e-mail message.

Alternatively, from step 718, an e-mail request message may be sent directly to the E-mail PC 218, which is connected to a conventional e-mail system, such as MCI Mail. As so, step 724 is bypassed and step 742 is executed directly. From here, no escalation takes place. Alternative to steps 742 and 743, a voice mail may be sent (step 744).

Parallel to the appropriate autonotification process taking place in steps 742, 743, and 744, the problem description is sent to a Production Control monitor in step 745. This monitor is commonly a dumb terminal, allowing no interaction. It is used to notify Production Control of the problem.

Messages for which the PMR switch is set to "Yes" are sent from the Traffic Cop in step 702 to a Problem Management Records process 708. This process will automatically generate a Problem Management Record (PMR) within a PMR system. GLV2 402g contains information identifying the location, or LPAR, where the PMR system resides. In step 758, the analysis message is transmitted to a central repository on the same LPAR as the PMR system, and stored in a dynamic global variable GLV1 401h. In step 760, the information contained in GLV1 401h is loaded into the PMR system via an interface. This transfer of GLV1 401h into the PMR system executes according to a time-of-day rule. In one embodiment of the system, this occurs once each hour.

Messages for which all autonotification switches are set to "No" are sent from the Traffic Cop 702 to a Non-Notification process 710. No autonotification processes will be performed, but a record of the job's triggering event will be kept. This message could be a detection message, if it is received from the Non-notification decision-support process 610 in the analysis process 304, or an analysis message. The message is stored in GLV1 401g, where it is loaded into a flat file in step 762 via daily batch feed. In step 764, the flat file is copied to a dataset and transmitted to a central site for storage and future reference.

With the modularity and configurability provided with use of Data Control Tables, from which global variables GLV2 402a . . . 402g are derived, the invention may be expanded to include other notification services, detection traps, and control data. The invention may also be ported to various enterprises in numerous industries.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An autonotification system for use in a network environment, wherein said network processes a job, the system comprising:

a pre-determined notification procedure having an instruction indicating a first recipient to notify when a triggering event occurs while the job is being processed;

an auxiliary procedure for entering a plurality of global variables into the system; including a global variable to notify a default recipient different from said first recipient;

means for confirming receipt of a notification;

means for escalating said notification to said default recipient, if said first recipient does not accept and, said escalating means also escalating said notification when said first recipient does not confirm within a predetermined time period;

means for detecting one of a plurality of traps occurring from the processing of said job and generating a detection message corresponding to said trap;

means for analyzing said detection message to determine whether said trap is eligible for one of a plurality of notification services and generating an analysis message, wherein said means for analyzing comprises an applications (APPS) process;

a user-invoked process;

a non-notification process;

a systems software process; and a default process; and autonotification means for automatically notifying said first recipient according to an autonotification message.

2. The system of claim 1, wherein said detection message comprises:

a job name for the job, wherein the jobname includes a high level qualifier (HLQ);

a job number for the job;

a resource access control facility (RACF) ID for the job;

a logical partition (LPAR) number identifying an LPAR on which the job executed;

a code identifying said triggering event; and a trap ID.

3. The system of claim 2, wherein said detection message further comprises a job triggering event date/time/step entry.

4. The system of claim 1, wherein said plurality of notification services comprises one or more of:

an alpha-numeric paging notification service;

a numeric paging notification service;

an electronic mail notification service;

a program management record (PMR) notification service; and a non-notification service.

5. The system of claim 1, wherein said autonotification means includes a traffic cop to determine which one of said plurality of notification services should be accessed.

6. The system of claim 1, wherein said analysis message comprises said detection message and a master record, the master record comprising:

a group ID;

an on/off processing switch; and a plurality of autonotification switches, each autonotification switch corresponding to one of said plurality of notification services.

7. The system of claim 6, wherein said analysis message further comprises at least one subgroup ID.

8. The system of claim 1, wherein said autonotification message comprises said analysis message and a paging information table, wherein said paging information table comprises:

at least one paging number;

an escalation sequence, said escalation sequence including times for executing said escalation sequence; and a security code for accessing a voice response unit (VRU).

9. The system of claim 1, wherein said autonotification message comprises said analysis message and an e-mail information table, wherein said e-mail information table comprises at least one e-mail address.

10. The system of claim 1, wherein said confirmation means includes a voice response unit.

11. An automated method of notifying a user of the occurrence of a triggering event during the execution of a job on a mainframe logical partition (LPAR) within a network environment, the method comprising the steps of:

detecting a trap;

generating a detection message corresponding to said trap;

analyzing said detection message to determine if the job is one that should be tracked, including:

determining whether autonotification should be conducted for the LPAR that the job executed on;

allocating a unique problem ID for tracking the job, if the job is one to be tracked;

matching a high level qualifier associated with the job to a master record;

determining which one of a plurality of decision-support processes should be performed; and performing said decision-support process;

generating an analysis message;

feeding said analysis message to a traffic cop;

determining a notification service to execute; and performing said notification service.

12. The method of claim 11, wherein said step of performing said notification service comprises the steps of:

generating an autonotification message;

generating a write to operator respond (WTOR) message containing all pertinent information for sending said notification;

sending said WTOR message to an outboard console personal computer (OBCP);

receiving an acknowledgment back;

transmitting a notification request to a voice response unit (VRU);

creating a voice response problem text to be played to the recipient of said notification;

transmitting a notification request message to an appropriate personal computer (PC) for generating said notification service;

issuing said notification;

alerting production control of the triggering event for display on a monitor;

informing said VRU of receipt of said notification; and selecting one of three options to listen to the problem, transfer the problem to a production control center, and exit VRU.

13. The method of claim 12, wherein said option to listen to the problem further comprises the step of selecting one of the further options of acknowledging receipt of the problem, rejecting responsibility for the problem, replaying the problem description, and requesting additional information about the problem.

14. The method of claim 13, wherein said selection of said option acknowledging receipt of the problem further comprises the steps of:

recording the recipient's name;

acknowledging acceptance of the problem to the appropriate LPAR; and clearing all data corresponding to the accepted problem.

15. The method of claim 13, wherein said selection of said option rejecting responsibility for the problem further comprises the steps of:

transferring the recipient back to said step of selecting one of three options;

determining next escalation; and triggering said notification for next escalation.

16. The method of claim 11, wherein said step of performing said notification service comprises the steps of:

generating a problem management report (PMR);

storing said PMR into a global variable;

transmitting said global variable to a central repository on the same LPAR where a PMR system resides; and loading said global variable into said PMR system using time-of-day rules.

17. The method of claim 11, wherein said step of performing said notification service comprises the steps of:

recording the triggering event;

storing one of said analysis message and said detection message into a flat file;

copying said flat file to a dataset; and transmitting said flat file to a central site for storage and future reference.

18. A method of invoking time sensitive processes and loading global variables from data control tables into an Autonotification system, the steps comprising:

executing a single time-of-day rule every minute;

triggering a process detector that reads in a program control table specifying the cycle and frequency of each time sensitive process used by the system and loads the global variables from the data control tables into the system;

executing each time sensitive process in said program control table per table instructions;

loading the data control tables into at least two partitioned datasets; and transmitting said partitioned datasets into global variables on a plurality of mainframe logical partitions (LPARs) using daily batch transmission.

19. A computer program product for use within a multiuser data processing system environment, comprising:
 a computer usable medium having computer readable program code means embodied in the medium for enabling a computer to provide an autonotification system within a networking environment that notifies a recipient of the occurrence of a triggering event during execution of a job on a mainframe logical partition (LPAR), the computer program product having:
  computer readable program code means for enabling the computer to detect one of a plurality of traps occurring from the execution of a job and generate a detection message corresponding to the trap wherein said plurality of traps comprises
   a time-of-day rule trap;
   a message rule trap; and
   a user-invoked rule trap;
  computer readable program code means for enabling the computer to analyze said detection message to determine whether said trap is eligible for one of a plurality of notification services and to generate an analysis message;
  computer readable program code means for enabling the computer to generate an autonotification message and to notify a first recipient using one of the notification services;
  computer readable program code means for enabling the computer to escalate a notification to a default recipient different from said first recipient;
  computer readable program code means for enabling the computer to confirm receipt of said notification; and
  computer readable program code means for enabling the computer to enter a plurality of global variables into the system.

20. A program storage device readable by a machine, tangibly embodying a program of instructions executable by the machine to perform method steps within a multiuser data processing system environment for providing an autonotification system within a networking environment for notifying a recipient of the occurrence of a triggering event during execution of a job on a mainframe logical partition (LPAR), the method steps comprising at compile time:
 detecting a trap;
 generating a detection message corresponding to said trap;
 analyzing said detection message to determine if the job is one that should be tracked, including:
  determining whether autonotification should be conducted for the LPAR that the job executed on;
  allocating a unique problem ID for tracking the job, if the job is one to be tracked;
  matching a high level qualifier associated with the job to a master record;
  determining which one of a plurality of decision-support processes should be performed; and
  performing the decision-support process;
 generating an analysis message;
 feeding said analysis message to a traffic cop;
 determining a notification service to execute; and
 performing said notification service.

21. The method of claim 20, wherein said step of performing said notification service comprises the steps of:
 generating an autonotification message;
 generating a write to operator respond (WTOR) message containing all pertinent information for sending said notification;
 sending said WTOR message to an outboard console personal computer (OBCP);
 receiving an acknowledgment back;
 transmitting a notification request to a voice response unit (VRU);
 creating a voice response problem text to be played to the recipient of said notification;
 transmitting a notification request message to an appropriate personal computer (PC) for generating said notification service;
 issuing said notification;
 alerting production control of the triggering event for display on a monitor;
 informing said VRU of receipt of said notification; and
 selecting one of three options to listen to the problem, transfer the problem to a production control center, and exit VRU.

22. The method of claim 21, wherein said option to listen to the problem further comprises the step of selecting one of the further options of acknowledging receipt of the problem, rejecting responsibility for the problem, replaying the problem description, and requesting additional information about the problem.

23. The method of claim 22, wherein said selection of said option for acknowledging receipt of the problem further comprises the steps of:
 recording the recipient's name;
 acknowledging acceptance of the problem to the appropriate LPAR; and
 clearing all data corresponding to the accepted problem.

24. The method of claim 22, wherein said selection of said option for rejecting responsibility for the problem further comprises the steps of:
 transferring the recipient back to the step of selecting one of three options;
 determining next escalation; and
 triggering another notification.

25. The method of claim 20, wherein said step of performing said notification service comprises the steps of:
 generating a problem management report (PMR);
 storing said PMR into a global variable;
 transmitting said global variable to a central repository on the same LPAR where a PMR system resides; and
 storing said global variable into said PMR system using time-of-day rules.

26. The method of claim 20, wherein said step of performing said notification service comprises the steps of:
 recording said triggering event;
 storing said analysis message into a flat file;
 copying said flat file to a dataset; and
 transmitting said flat file to a central site for storage and future reference.

27. A program storage device readable by a machine, tangibly embodying a program of instructions executable by the machine to perform method steps within a multiuser data processing system environment for invoking time sensitive processes and loading global variables from data control tables into an autonotification system, the method steps comprising at compile time:
 executing a single time-of-day rule every minute;
 triggering a process detector that reads in a program control table specifying the cycle and frequency of each time sensitive process used by the system and loads the global variables from the data control tables into the system;

executing each time sensitive process entry in said program control table per table instructions;

loading data control tables into at least two partitioned datasets; and transmitting said partitioned datasets into global variables on a plurality of mainframe logical partitions (LPARs) using daily batch transmission.

28. An autonotification system for use in a network environment, wherein said network processes a job, the system comprising:

- a pre-determined notification procedure having an instruction indicating a first recipient to notify when a triggering event occurs while the job is being processed;
- an auxiliary procedure for entering a plurality of global variables into the system, including a global variable to notify a default recipient different from said first recipient;
- means for confirming receipt of a notification;
- means for escalating said notification to said default recipient, if said first recipient does not accept and, said escalating means also escalating said notification when said first recipient does not confirm within a predetermined time period;
- means for detecting one of a plurality of traps occurring from the processing of said job and generating a detection message corresponding to said trap, wherein said plurality of traps comprises:
  - a time-of-day rule trap that executes according to a pre-defined schedule;
  - a message rule trap that executes according to an operating system message; and
  - a user-invoked rule trap that executes according to a user-defined instruction;
- means for analyzing said detection message to determine whether said trap is eligible for one of a plurality of notification services; and
- autonotification means for automatically notifying said first recipient.

29. The system of claim 28, wherein said plurality of traps further comprises a system software rule trap that executes according to an external program.

30. An autonotification system for use in a network environment, wherein said network processes a job, the system comprising:

- a pre-determined notification procedure having an instruction indicating a first recipient to notify when a triggering event occurs while the job is being processed;
- an auxiliary procedure for entering a plurality of global variables into the system, including a global variable to notify a default recipient different from said first recipient, wherein said auxiliary procedure includes transferring a plurality of data control tables into global variables, said data control tables comprising at least two partitioned data sets, said partitioned data sets comprising:
  - an application-related data set; and
  - a system control data set;
- means for confirming receipt of a notification; and
- means for escalating said notification to said default recipient, if said first recipient does not accept and, said escalating means also escalating said notification when said first recipient does not confirm within a predetermined time period.

31. The system of claim 30, wherein said application-related data set comprises:

- a master record table;
- a paging information table;
- an e-mail information table; and
- a late job table.

32. The system of claim 30, wherein said system control data set comprises:

- an LPAR table;
- a transmission control table; and
- a program control table.

33. An autonotification system for use in a network environment, wherein said network processes a job, the system comprising:

- a pre-determined notification procedure having an instruction indicating a first recipient to notify when a triggering event occurs while the job is being processed;
- an auxiliary procedure for triggering a time-of-day rule to invoke a plurality of time sensitive processes and for entering a plurality of global variables into the system, including a global variable to notify a default recipient different from said first recipient;
- means for confirming receipt of a notification; and
- means for escalating said notification to said default recipient, if said first recipient does not accept and, said escalating means also escalating said notification when said first recipient does not confirm within a predetermined time period.

34. The system of claim 33, further comprising:

- means for detecting one of a plurality of traps occurring from the processing of said job and generating a detection message corresponding to said trap;
- means for analyzing said detection message to determine whether said trap is eligible for one of a plurality of notification services and generating an analysis message; and
- autonotification means for automatically notifying said first recipient according to an autonotification message.

35. The system of claim 34, wherein said detection message comprises:

- a job name for the job, wherein the jobname includes a high level qualifier (HLQ);
- a job number for the job;
- an resource access control facility (RACF) ID for the job;
- a logical partition (LPAR) number identifying an LPAR on which the job executed;
- a code identifying said triggering event; and
- a trap ID.

36. The system of claim 34, wherein said plurality of notification services comprises one or more of:

- an alpha-numeric paging notification service;
- a numeric paging notification service;
- an electronic mail notification service;
- a program management record (PMR) notification service; and
- a non-notification service.

37. The system of claim 34, wherein said plurality of traps comprises:

- a time-of-day rule trap that executes according to a pre-defined schedule;
- a message rule trap that executes according to an operating system message; and
- a user-invoked rule trap that executes according to a user-defined instruction.

* * * * *